(12) United States Patent
Casey et al.

(10) Patent No.: US 7,108,793 B2
(45) Date of Patent: Sep. 19, 2006

(54) METHOD OF SEPARATING LIQUID FROM LIQUID LADEN SOLID MATERIAL

(75) Inventors: Dwight P. Casey, Lindenhurst, IL (US); Tobin L. Imes, Crystal Lake, IL (US); Oscar L. Mathis, Jr., Cary, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 76 days.

(21) Appl. No.: 10/412,529

(22) Filed: Apr. 11, 2003

(65) Prior Publication Data
US 2003/0217960 A1 Nov. 27, 2003

Related U.S. Application Data

(63) Continuation-in-part of application No. 10/121,097, filed on Apr. 11, 2002.

(51) Int. Cl.
B01D 39/10 (2006.01)
B01D 33/03 (2006.01)
B01D 35/20 (2006.01)
B01D 33/54 (2006.01)
B07B 1/12 (2006.01)

(52) U.S. Cl. .............. 210/767; 210/780; 210/388; 210/389; 210/498; 210/499; 209/393; 209/395; 209/396

(58) Field of Classification Search .............. 210/767, 210/780, 388, 389, 498, 499; 209/393, 395, 209/396
See application file for complete search history.

(56) References Cited

U.S. PATENT DOCUMENTS

| | | | |
|---|---|---|---|
| 728,390 A * | 5/1903 | Graham | 210/400 |
| 1,942,948 A * | 1/1934 | Booth | 209/393 |
| 2,014,431 A | 9/1935 | Foster | |
| 2,084,433 A * | 6/1937 | Chorlton | 210/437 |
| 2,089,548 A * | 8/1937 | Frantz et al. | 210/389 |
| 2,142,600 A * | 1/1939 | Bixby | 209/393 |
| 2,183,896 A * | 12/1939 | Rupp et al. | 210/785 |
| 2,208,448 A * | 7/1940 | Bixby | 209/393 |
| 2,457,018 A * | 12/1948 | Wantling | 209/267 |
| 2,503,875 A | 4/1950 | Kern | |

(Continued)

FOREIGN PATENT DOCUMENTS

DE 2260170 6/1974

(Continued)

OTHER PUBLICATIONS

Copy of International Search Report for International Application No. PCT/US03/11042, dated Jul. 30, 2003, 6 pages.

(Continued)

*Primary Examiner*—Thomas M. Lithgow
(74) *Attorney, Agent, or Firm*—Marshall, Gerstein & Borun LLP

(57) ABSTRACT

A method of separating a liquid from a liquid-laden solid material includes providing a trough having a deck defining a support surface with passages extending through the support surface. The liquid-laden solid material is deposited onto the support surface so that the liquid-laden solid material is supported by the support surface. A vibratory force is applied to the deck to separate a substantial portion of the liquid from the liquid-laden solid material. The liquid separated from the liquid-laden solid material is directed under gravity force through the passages extending through the support surface. The solid material is conveyed along the support surface by the vibratory force to a solids discharge point.

10 Claims, 7 Drawing Sheets

U.S. PATENT DOCUMENTS

| Patent No. | | Date | Inventor | Ref. |
|---|---|---|---|---|
| 2,585,719 | A | 2/1952 | Alvord | |
| 2,588,088 | A * | 3/1952 | Cover | 209/269 |
| 2,648,441 | A * | 8/1953 | Soldan | 210/389 |
| 2,677,463 | A | 5/1954 | Von Bolhar et al. | |
| 2,799,398 | A * | 7/1957 | Heymann | 210/388 |
| 2,899,061 | A * | 8/1959 | Schroth | 209/408 |
| 3,116,819 | A | 1/1964 | Katz | |
| 3,134,733 | A * | 5/1964 | Rose | 209/393 |
| 3,255,885 | A * | 6/1966 | Burls | 209/314 |
| 3,257,309 | A * | 6/1966 | Fauchier et al. | 208/131 |
| 3,365,281 | A | 1/1968 | Musschoot et al. | |
| 3,411,171 | A | 11/1968 | Musschoot et al. | |
| 3,787,318 | A * | 1/1974 | Coleman, Jr. | 210/767 |
| 3,805,955 | A * | 4/1974 | Bixby et al. | 209/395 |
| 3,859,713 | A * | 1/1975 | Fiedler | 29/423 |
| 3,970,549 | A * | 7/1976 | Ennis et al. | 209/341 |
| RE29,512 | E | 1/1978 | Musschoot | |
| 4,146,483 | A | 3/1979 | Lee | |
| 4,171,948 | A | 10/1979 | Kraus et al. | |
| 4,258,779 | A | 3/1981 | Musschoot | |
| 4,357,760 | A | 11/1982 | Musschoot | |
| 4,459,207 | A | 7/1984 | Young | |
| 4,482,046 | A | 11/1984 | Kraus | |
| 4,526,121 | A * | 7/1985 | Shudo et al. | 114/73 |
| 4,611,709 | A | 9/1986 | Kraus et al. | |
| 4,624,370 | A | 11/1986 | Danner et al. | |
| 4,715,950 | A | 12/1987 | Danner et al. | |
| 4,844,235 | A | 7/1989 | Sherman | |
| 4,844,236 | A | 7/1989 | Kraus | |
| 4,856,640 | A | 8/1989 | Beswick et al. | |
| 5,076,921 | A | 12/1991 | Bailey et al. | |
| 5,094,342 | A | 3/1992 | Kraus et al. | |
| 5,098,586 | A | 3/1992 | Rudolph | |
| 5,190,161 | A * | 3/1993 | Arai | 209/400 |
| 5,614,094 | A * | 3/1997 | Deister et al. | 210/388 |
| 5,690,826 | A | 11/1997 | Cravello | |
| 5,720,881 | A * | 2/1998 | Derrick et al. | 210/388 |
| 6,702,102 | B1 | 3/2004 | Kraus et al. | |
| 2003/0192819 | A1 | 10/2003 | Casey et al. | |
| 2003/0201237 | A1 | 10/2003 | Grichar et al. | |
| 2004/0200786 | A1 | 10/2004 | Irvine | |

FOREIGN PATENT DOCUMENTS

| | | | |
|---|---|---|---|
| EP | | 100132 * | 2/1984 |
| WO | WO 01/45867 A1 | | 6/2001 |

OTHER PUBLICATIONS

Copy of Written Opinion for International Patent Application No. PCT/US03/11042, dated Feb. 12, 2004, 7 pages.

* cited by examiner

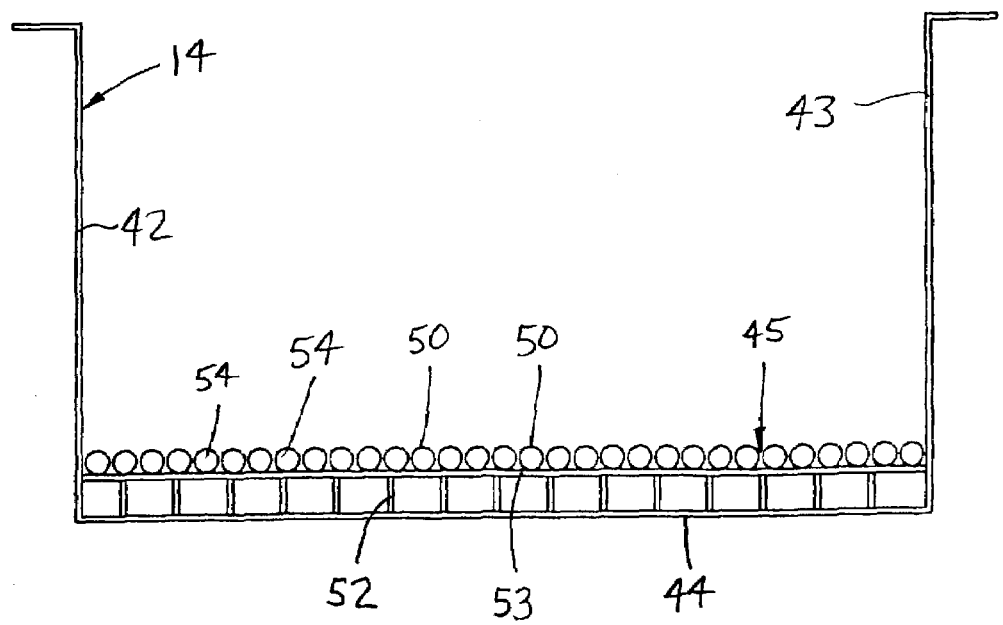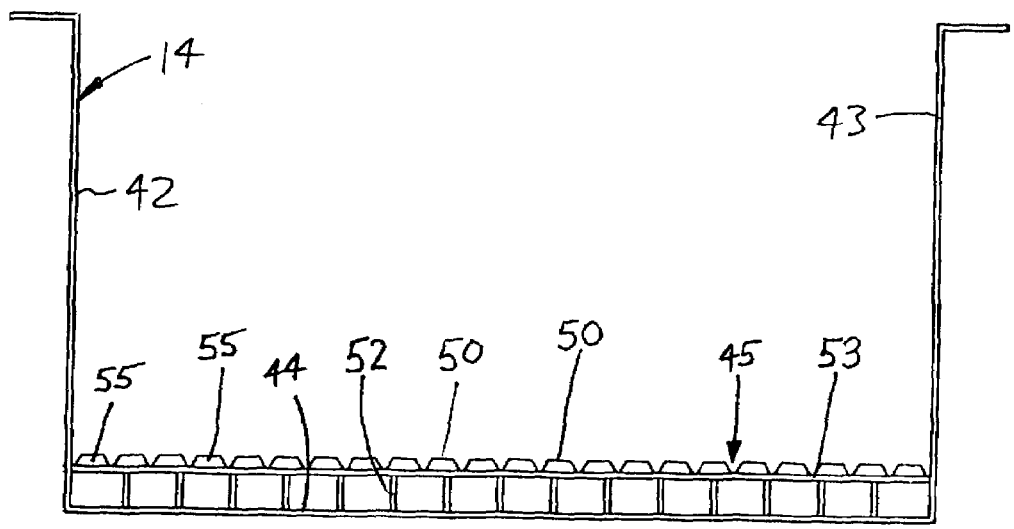

_US 7,108,793 B2_

METHOD OF SEPARATING LIQUID FROM LIQUID LADEN SOLID MATERIAL

CROSS-REFERENCE TO RELATED APPLICATION

This is a continuation-in-part of application Ser. No. 10/121,097, filed Apr. 11, 2002.

FIELD OF THE INVENTION

The present invention generally relates to methods of dewatering solids, and more particularly to using a vibratory force to separate liquid from a liquid-laden solid material.

BACKGROUND OF THE INVENTION

The need for separating liquid from a liquid-laden solid material may arise in a variety of applications. As crude oil is refined, for example, a residual material known as petroleum coke may be generated. Petroleum coke is a granular solid that is highly combustible. It is typically created in a coking drum having removable end caps, wherein a single piece of petroleum coke remains lodged inside the drum. To remove the petroleum coke from the drum, the end caps are removed and a hydraulic drill is inserted through a center of the piece of petroleum coke. The hydraulic drill first passes axially through the drum to create a two to three foot bore through the center of the petroleum coke. The drill is then pivoted so that its head is aligned radially with respect to the drum axis, and the drill is rotated to cut through and dislodge the petroleum coke material located nearer the drum. During the drilling and cutting processes, water is typically used to assist removal of the coke from the drum. Eventually, all of the petroleum coke and water will drop out of the bottom of the drum.

Further processing of the petroleum coke and water has typically included passing the material through a screen into a pit. The water and the petroleum coke is then pulled out of the pit and discharged into an evaporation field. Once the water content is sufficiently reduced, the petroleum coke is then loaded into rail cars which ultimately discharge the coke onto a conveyor. Consequently, the petroleum coke must be handled at separate transfer points, such as from the pit to the evaporation field and from the evaporation field to the conveyor. Furthermore, such handling often requires the use of rail cars which are overly expensive and time consuming to use. Still further, the use of evaporating pits requires a substantial amount of time for the water content of the petroleum coke to drop to a level sufficient for further handling, transport, and/or use.

Some petroleum coke dewatering processes are known which attempt to use screens to retain the solid material while allowing the liquid to pass through. Such systems may employ conventional or vibrating screens. A common problem with such screens, whether conventional or vibrating, is that solids suspended in the liquid tend to clog the screen, thereby interrupting the dewatering process.

BRIEF DESCRIPTION OF THE DRAWINGS

FIG. 6 is an end view of an alternative tough having a deck formed of round rods.

FIG. 7 is an end view of an alternative tough having a deck formed of tapered bars.

DETAILED DESCRIPTION

Figure 1:
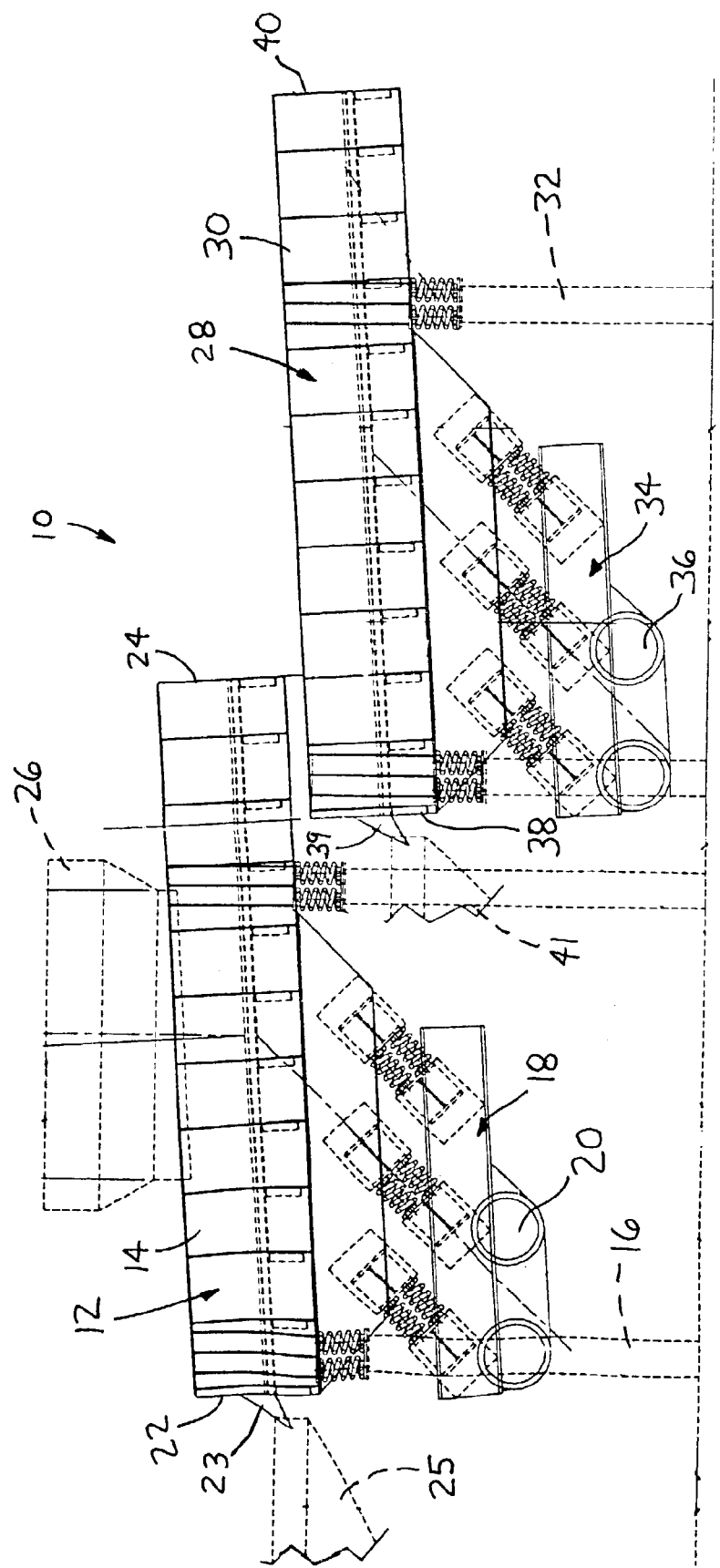
FIG. 1 is a side elevation view of vibratory separating apparatus in accordance with the teachings of the present invention.

Referring to FIG. 1, vibratory apparatus for separating liquid from a liquid-laden solid material is indicated generally by reference numeral 10. The vibratory separating apparatus 10 is described herein for use in a petroleum coke dewatering process. It will be understood, however, that this is but a single application, and that the vibratory separating apparatus 10 may be used in any process that would benefit from the efficient separation of liquid from a liquid-laden solid material.

Figure 11:
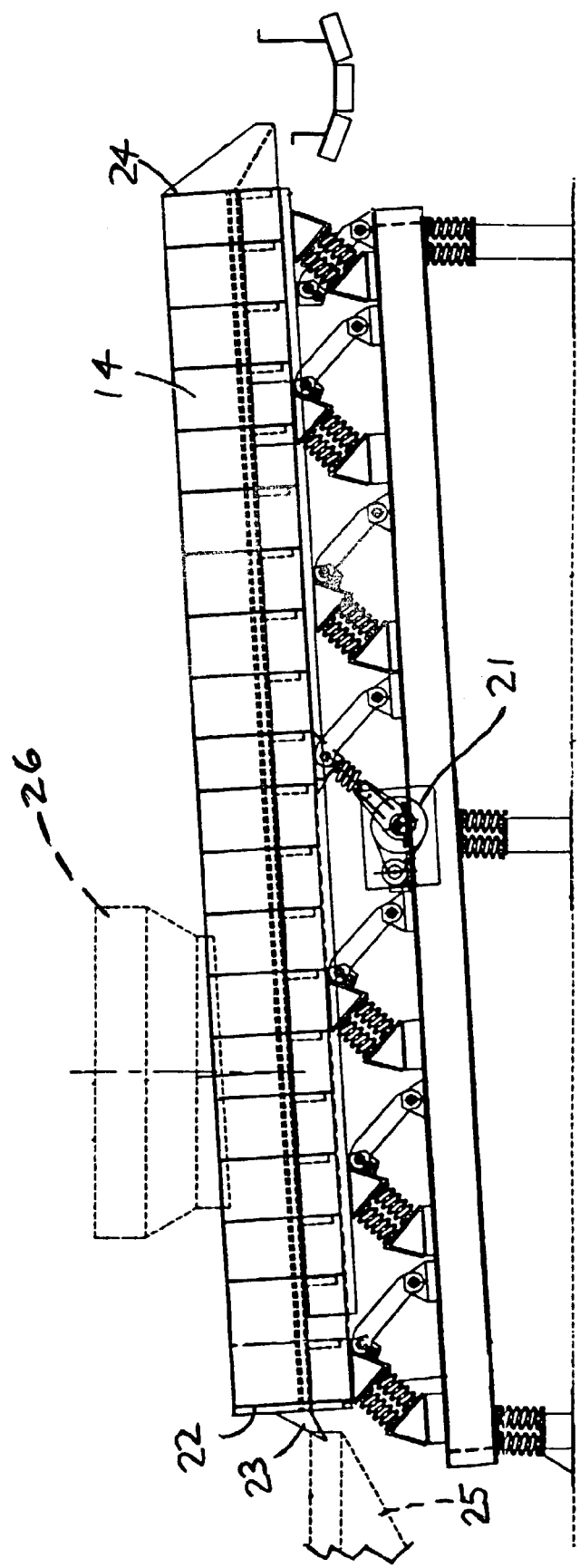
FIG. 11 is a side elevation view of a vibratory separating apparatus having an alternative drive.

As shown in FIG. 1, the vibratory separating apparatus 10 includes a first separating unit 12 having a trough 14 supported by a frame 16. An exciter 18 is attached to the trough 14 and includes a rotating unbalance drive 20 for generating a vibratory motion, as is generally known in the art. Alternatively, the separating unit 12 may include a rotating eccentric drive 21, as illustrated in FIG. 11.

The trough 14 is oriented on an incline so that a first end 22 is positioned below a second end 24. While the solid material is typically advanced up the incline, as described in greater detail below, it is not necessary, and the trough may be declined or horizontal. By advancing the solid material up the incline, the period during which the solid material is in the apparatus 10 (also known as "dwell time") may be increased. The exciter 18 is oriented so that the vibratory motion created by the drive 20 imparts a conveying motion toward the elevated second end 24. A hopper 26 may be positioned above a central portion of the trough 14 for directing liquid-laden material into the trough. For example, a coking drum having petroleum coke lodged therein may be positioned over the hopper 26, so that the pieces of petroleum coke removed from the drum fall into the central portion of the trough 14. The first end 22 of the trough 14 further includes a chute 23 for directing liquid into a drainage receptacle 25.

In the illustrated embodiment, the vibratory separating apparatus 10 also includes a second separating unit 28 that is substantially identical to the first separating unit 12. Accordingly, the second separating unit 28 includes a trough 30 supported by a frame 32. An exciter 34 is operably connected to the trough 30 and includes a drive 36 for generating a vibratory motion. The trough 30 is also oriented on an incline so that a first end 38 is lower than a second end 40 of the trough. The exciter 34 is oriented to impart a conveying motion which advances material in the trough 30 from the first end 38 to the elevated second end 40. Apparatus for generating such a vibratory conveying motion are generally known in the art, and therefore are not described in detail herein. The first end 38 of the trough 30 also includes a chute 39 for directing liquid into a drainage receptacle 41.

The first end 38 of the trough 30 may be positioned below the second end 24 of the trough 14, so that material advancing over the second end 24 of the trough 14 will drop into the trough 30 of the second separating unit 28. In the illustrated embodiment, the second end 24 of trough 14 is positioned somewhat upstream of the first end 38 of trough 30. The second end 40 of the trough 30 may be positioned over a receptacle, conveyor, or other transport apparatus for further processing of the solid material. It will be appreciated that the second unit 28 further separates liquid from the liquid-laden solid material, but is not required in all applications, since a single separating unit 12 may provide sufficient separation.

While both exciters 18, 34 are shown position below the troughs 14, 30, it will be appreciated that the exciters may be positioned above the troughs or in any other location currently known in the art.

Figure 2:
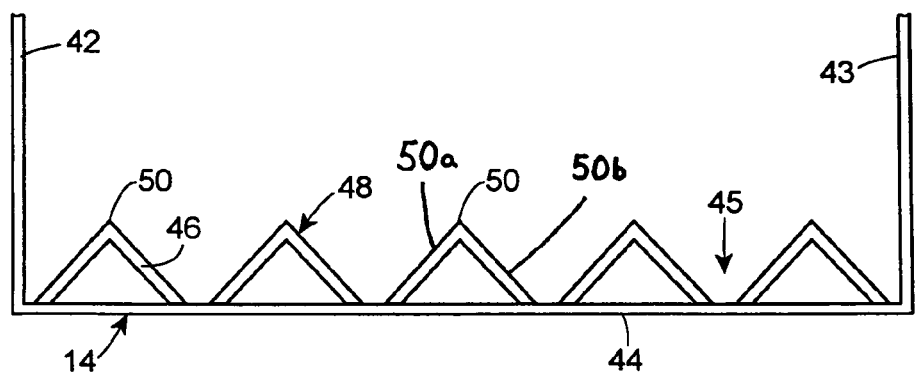
FIG. 2 is a schematic end view of a trough used in the apparatus shown in FIG. 1.

FIG. 2 illustrates an end view of the trough 14. The trough 14 includes opposing sidewalls 42, 43 connected by a base 44. A plurality of V-shaped angles 46 are attached to the base 44 and extend longitudinally along the length of the trough 14. Each V-shaped angle 46 has an apex 48 and defines one or more support points 50. Each V-shaped angle 46 further includes first and second support faces 50a, 50b oriented at an angle with respect to a horizontal plane. In the current embodiment in which the V-shaped angles 46 extend continuously along the length of the trough 14, the support points 50 create a pattern of support lines. The support points 50 are positioned above the base 44 and are spaced at a distance sufficient to engage and support substantially all of the solid material above the base 44. Edges of adjacent V-shaped angles define passages 45, which allow the fluid contained by the material to pass through to the base 44. Accordingly, the V-shaped angles 46 suspend the solid material above the base 44 to allow liquid to drain from the solid material under the force of gravity.

Because the trough 14 in the illustrated embodiments is on an incline, the liquid will flow toward the first end 22 and through the chute 23 for discharge into the drainage receptacle 25. In contrast, the solid material supported by the V-shaped angles 46 is advanced toward the second end 24 of the trough 14 as a result of the vibratory conveying motion generated by the exciter 18. The solid material is ultimately discharged into the trough 30 of the second separating unit 28 having a substantially identical base construction. Accordingly, additional liquid is removed from the solid material and flows to the first end 38 and through the chute 39 for discharge into the drainage receptacle 41, while the solid material is advanced toward the second end 40 of the trough 30.

While FIG. 2 illustrates apparatus in which the solid and liquid materials flow in opposite directions (i.e., a reverse flow arrangement), the separating units 12, 28 may be configured for other material flow patterns. For example, the solid material may be conveyed down the inclined trough and a liquid drainage point may be located upstream of the solids discharge point, to produce a concurrent flow of solid and liquid materials. In addition, the trough may be horizontal, with concurrent or reverse material flow paths. Furthermore, the liquid drainage point may be an outlet formed in the base, while the solids discharge point may be the trough first end.

Figure 3:
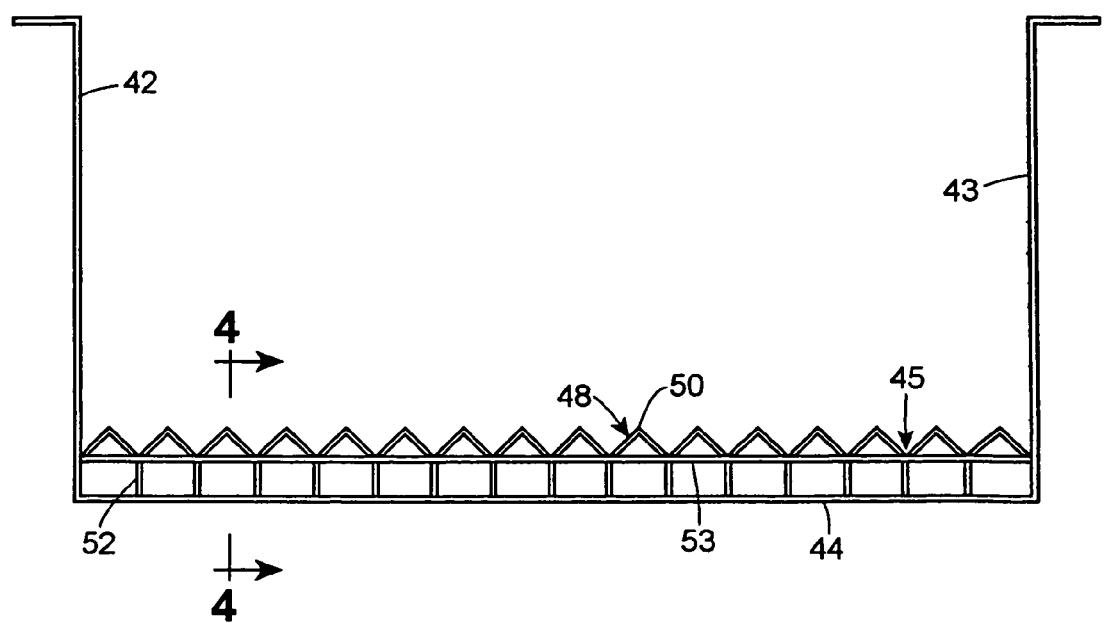
FIG. 3 is an end view of an alternative trough having an elevated support bed.
Figure 4:
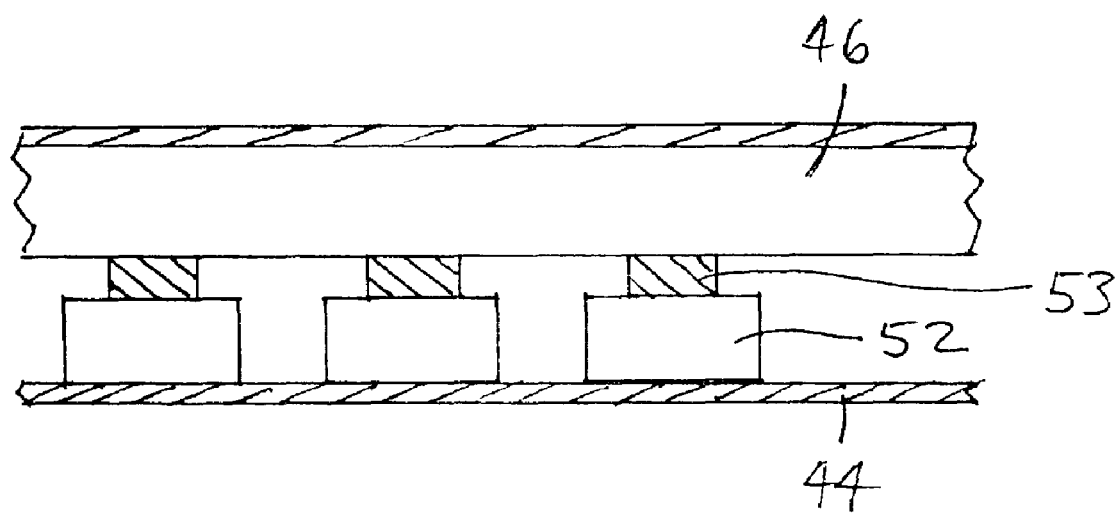
FIG. 4 is a side elevation view, in cross-section, taken along line 4—4 of FIG. 3.

In an alternative trough embodiment illustrated at FIGS. 3 and 4, the support points 50 are further elevated with respect to the trough base 44. In this embodiment, spacer bars 52 are intermittently positioned along the length of the trough base 44. Cross bars 53 are attached to the tops of the spacer bars 52 and extend transversely across the trough 14. The V-shaped angles 46 are then attached to the cross bars 53. Liquid may flow through the passages 45 between adjacent angles 46 and the gaps between the spacer and cross bars 52, 53 to drain from the solid material. The spacer and cross bars 52, 53 increase the height of the support points 50 with respect to the trough base 44, thereby increasing the liquid volume capacity of the separating unit. Alternatively, the trough base 44 may be removed and the liquid separated from the solid material may collect in a separate receptacle positioned below the trough 14.

Figure 5:
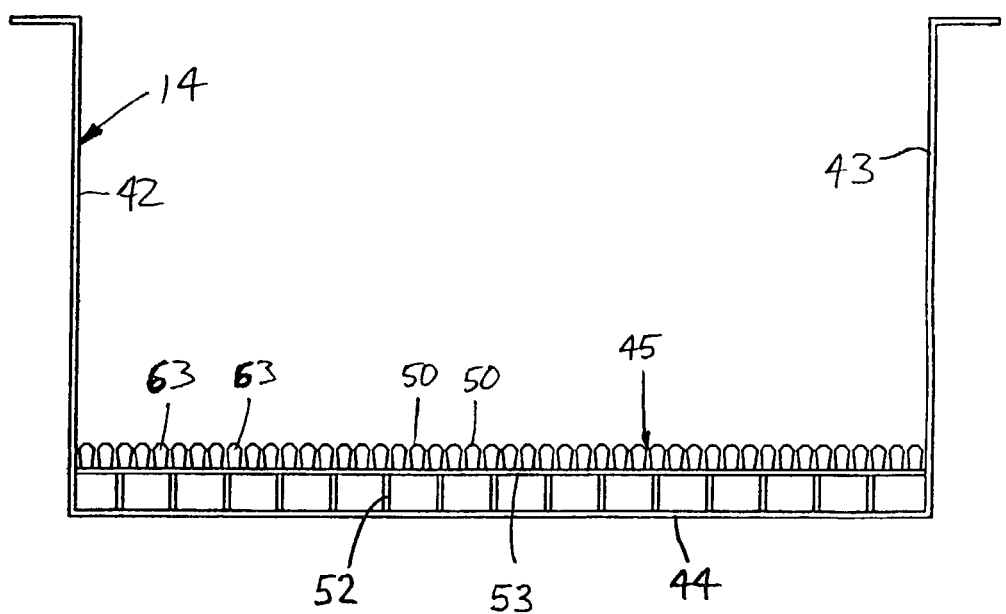
FIG. 5 is an end view of an alternative tough having a deck formed of grouser bars.
Figure 8:
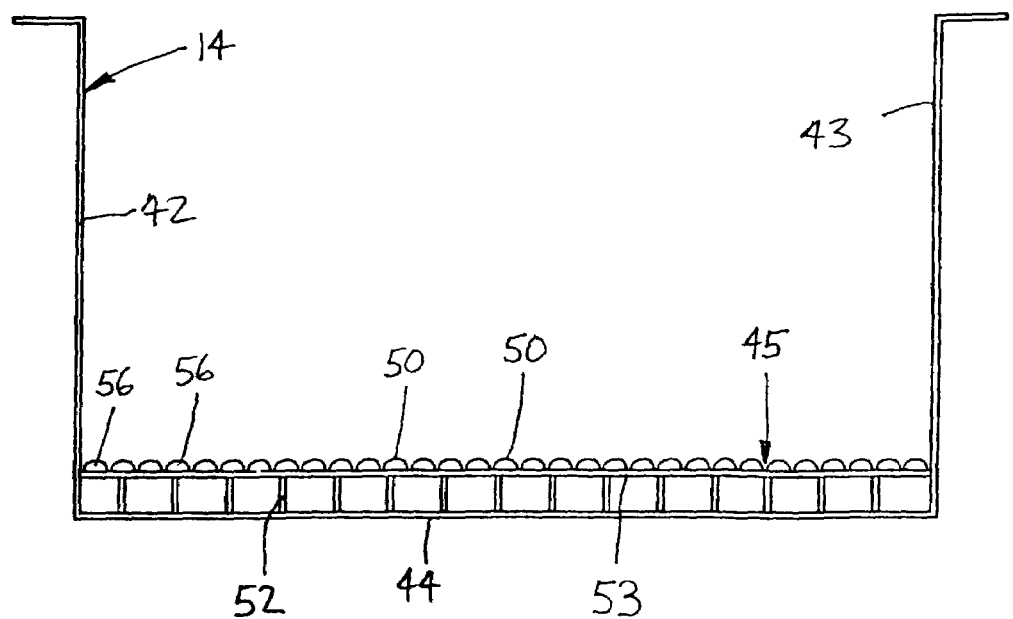
FIG. 8 is an end view of an alternative tough having a deck formed of half rounds.
Figure 9:
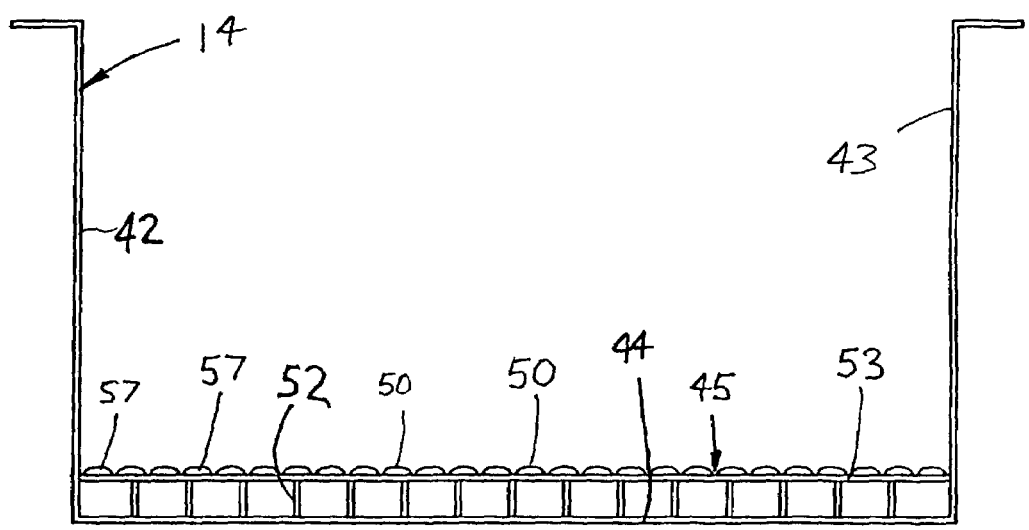
FIG. 9 is an end view of an alternative tough having a deck formed of half ovals.

While the above embodiments describe the use of V-shaped angles, it will be appreciated that any type of deck that creates support points positioned above the base 44 and spaced a distance sufficient to support the solid material may be used. Accordingly, the deck may comprise a plurality of grouser bars 63 (FIG. 5), round rods 54 (FIG. 6), tapered bars 55 (FIG. 7), half rounds 56 (FIG. 8), half ovals 57 (FIG. 9), or any other structure that defines the support points 50. The spacer and cross bars 52, 53 shown in the embodiments of FIGS. 5–9 may be omitted without departing from the teachings of the present invention.

Figure 10:
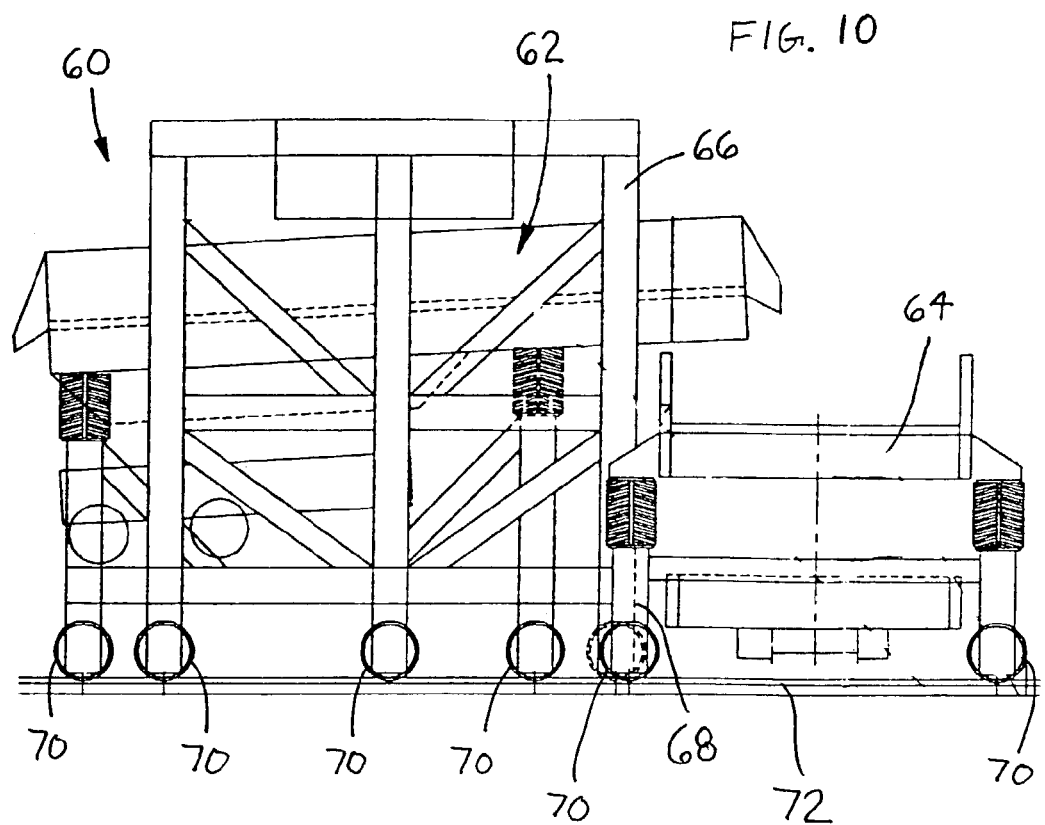
FIG. 10 is a side elevation view of an alternative vibratory separating apparatus adapted for mobile transportation.

In an alternative embodiment illustrated at FIG. 10, a vibratory separating apparatus 60 is shown that is adapted for mobile transportation. Similar to the embodiment of FIG. 1, the vibratory separating apparatus 60 includes first and second separating units 62, 64. Other than the second separating unit 64 being positioned transversely with respect to the first separating unit 62, the units 62, 64 are constructed substantially identical to the first and second separating units 12, 28 of the above embodiment. In addition, the first and second separating units 62, 64 are mounted on frames 66; 68 having wheels 70. As shown in FIG. 10, the wheels 70 are adapted for use with rails 72 to allow the vibratory separating apparatus 60 to be transported to different locations. This is particularly advantageous, for example, where multiple coking drums are located at a single site. As a result, a single vibratory separating apparatus 60 may be used to dewater petroleum coke from the various coking drums.

In operation, a petroleum coking drum may be positioned over the hopper 26 of the vibratory separating apparatus 10. The hopper 26 assists in directing the water-laden petroleum coke toward a central portion of the trough 14 of the first separating unit 12. The V-shaped angles 46 engage and support the petroleum coke above the base 44 of the trough 14, thereby allowing the water to drain from the coke to the trough base 44 via the passages 45. The inclined trough 14 causes the water to flow toward the first trough end 22 under the force of gravity, so that the water is discharged by the chute 23 into the drainage receptacle 25. The petroleum coke supported on the V-shaped angles 46, however, is advanced toward the trough second end 24 as a result of the vibratory motion generated by the exciter 18. The petroleum coke is eventually discharged from the second end 24 of the trough 14 into the trough 30 of the second separating unit 28. A similar process continues in the second separating unit 28, wherein additional liquid flows toward the trough first end 38 and through the chute 39 to discharge in the drainage receptacle 41. Vibratory motion generated by the exciter 34 advances the petroleum coke toward the trough second end 40. The petroleum coke may be discharged from the trough second end 40 onto a vibratory conveyor, receptacle, or other transport for further processing.

While FIG. 10 illustrates frames 66, 68 having wheels 70, it will be appreciated that other types of mobile frames, such as rotating or translating frames, may be used without departing from the scope of the present invention.

A method of separating liquid from liquid-laden solid material is also provided. The liquid-laden solid material may be deposited onto a support surface, such as the support points 50, having passages extending therethrough. A vibratory force is applied to the support surface to separate a substantial portion of the liquid from the liquid-laden solid material. As used herein, a substantial portion is at least 50%, and preferably at least 75–80% of the liquid content in the solid material. The liquid separated from the liquid-laden solid material is directed under gravity force through the passages extending through the support surface. The solid material is conveyed by the vibratory force along the support surface to a solids discharge point.

In the foregoing process and apparatus, it has been found that the application of the vibratory force to the support surface assists gravity in separating liquid from the liquid-laden solid material. In addition, the vibratory force used in the present apparatus and method reduces the amount of fines that may be suspended in and discharged with the liquid. The vibratory force drives fines suspended in the liquid downward through the liquid-laden solid material. As the fines travel downward, they tend to stick together to form larger solid bodies that are do not flow through the passages and therefore are conveyed with the rest of the solid material. Still further, by avoiding the use of screens, the process and apparatus disclosed herein do not plug and may be used continuously or in-line with other handling or processing equipment, in contrast to the batch processing required with conventional apparatus and methods.

Although certain apparatus and methods have been described herein, the scope of coverage of this patent is not limited thereto. On the contrary, this patent covers all embodiments of the teachings of the invention fairly falling within the scope of the appended claims either literally or under the doctrine equivalents.

The invention claimed is:

1. A method of separating liquid from a liquid-laden solid material, comprising:

providing a trough having a deck and a base defining a base surface, and said deck including a plurality of inverted V-shaped angles extending longitudinally along the trough defining an inclined support surface, each V-shaped angle having a solid first wall surface and a solid second wall surface, the first and second wall surface of each angle meeting along a first edge at an upwardly oriented apex which defines a support point positioned above the base, the support points of the angles being spaced from one another by a distance sufficient to support the solid material above the trough, and the first and second wall surface of each angle having a second edge, the second edges of adjacent angles being spaced to define a passage between adjacent support points, wherein the support points are located at an elevation sufficiently above the trough to allow liquid to drain from the solid material and flow through the passage to the trough;

depositing the liquid-laden solid material at a feed point on the support surface so that the liquid-laden solid material is supported by the support surface;

applying a vibratory force to the deck to separate a substantial portion of the liquid from the liquid-laden solid material;

directing the liquid separated from the liquid-laden solid material under gravity force through the passages extending through the support surface; and conveying the solid material up the inclined support surface by the vibratory force along the support surface to a solids discharge point at an elevation above the feed point.

2. The method of claim 1, in which the base surface positioned below the support surface and in fluid communication with the passages extending through the support surface, the method further comprising transferring the liquid along the base surface to a liquid drainage point.

3. The method of claim 2, in which the base surface is oriented at a decline so that the liquid is transferred vertically downward along the base surface.

4. The method of claim 2, in which a vibratory drive is coupled to the trough to apply the vibratory force to the deck.

5. The method of claim 1, in which the liquid-laden solid material comprises water-laden petroleum coke.

6. A method of separating liquid from a liquid-laden solid material, comprising:

providing a trough having a base surface and a deck defining an inclined support surface including a plurality of inverted V-shaped angles extending longitudinally along the base surface defining said inclined support surface, each V-shaped angle having a solid first wall surface and a solid second wall surface, the first and second wall surface of each angle meeting along a first edge at an upwardly oriented apex which defines a support point positioned above the base surface, the support points of the angles being spaced from one another by a distance sufficient to support the solid material above the base surface, and the first and second wall surface of each angle having a second edge, the second edges of adjacent angles being spaced to define a passage between adjacent support points, wherein the support points are located at an elevation sufficiently above the base surface to allow liquid to drain from the solid material and flow through the passage to the base surface;

depositing the liquid-laden solid material at a feed point on the support surface so that the liquid-laden solid material is supported by the support surface;

applying a vibratory force to the deck to separate a substantial portion of the liquid from the liquid-laden solid material;

directing the liquid separated from the liquid-laden solid material under gravity force through the passages extending through the support surface, along the base surface, to a liquid drainage point formed in the deck; and conveying the solid material up the inclined support surface by the vibratory force along the support surface to a solids discharge point at an elevation above the feed point.

7. The method of claim 6, in which the base surface is oriented at a decline so that the liquid is transferred vertically downward along the base surface.

8. The method of claim 6, in which a vibratory drive is coupled to the trough to apply the vibratory force to the deck.

9. The method of claim 6, in which the liquid-laden solid material comprise water-laden petroleum coke.

10. A method of separating liquid from liquid-laden petroleum coke, comprising:

providing an inclined trough having a base surface, the trough defining a solids discharge point and a liquid drainage point in fluid communication with the base surface;

providing a deck coupled to the trough, the deck defining an inclined support surface positioned above the base surface and in fluid communication with the solids discharge point, the support surface defining passages extending through the support surface and fluidly communicating with the base surface, the support surface including including a plurality of inverted V-shaped angles extending longitudinally along the base surface, each V-shaped angle having a solid first wall surface and a solid second wall surface, the first and second wall surface of each angle meeting along a first edge at an upwardly oriented apex which defines a support point positioned above the base surface, the support points of the angles being spaced from one another by a distance sufficient to support the solid material above the base surface, and the first and second wall surface of each angle having a second edge, the second edges of adjacent angles being spaced to define a passage between adjacent support points, wherein the support points are located at an elevation sufficiently above the base surface to allow liquid to drain from the solid material and flow through the passage to the base surface;

depositing the liquid-laden petroleum coke at a feed point on the support surface so that the liquid-laden petroleum coke is supported by the support surface;

applying a vibratory force to the deck to separate a substantial portion of the liquid from the liquid-laden petroleum coke;

directing the liquid separated from the liquid-laden petroleum coke under gravity force through the passages extending through the support surface, along the inclined base surface, and to the liquid drainage point; and conveying the petroleum coke up the inclined support surface by the vibratory force along the inclined support surface to the solids discharge point at an elevation above the feed point.

* * * * *